United States Patent [19]

Hausauer et al.

[11] Patent Number: 5,870,567
[45] Date of Patent: Feb. 9, 1999

[54] DELAYED TRANSACTION PROTOCOL FOR COMPUTER SYSTEM BUS

[75] Inventors: Brian S. Hausauer, Spring; Christopher J. Pettey, Houston; Thomas R. Seeman, Tomball, all of Tex.

[73] Assignee: Compaq Computer Corporation, Houston, Tex.

[21] Appl. No.: 775,300

[22] Filed: Dec. 31, 1996

[51] Int. Cl.$^6$ ........................................................ G06F 13/00
[52] U.S. Cl. ........................... 395/281; 395/292; 395/309
[58] Field of Search ................................ 395/281, 292, 395/308, 309, 287, 859

[56] References Cited

U.S. PATENT DOCUMENTS

| | | | |
|---|---|---|---|
| 5,533,204 | 7/1996 | Tipley | 395/288 |
| 5,535,340 | 7/1996 | Bell et al. | 395/292 |
| 5,594,882 | 1/1997 | Bell | 711/212 |
| 5,613,075 | 3/1997 | Wade et al. | 395/287 |
| 5,708,794 | 1/1998 | Parks et al. | 395/288 |

OTHER PUBLICATIONS

Chapter 14: Transaction Deferral and Chapter 25: 450GX and KX Chipsets, Pentium Pro System Architecture U.S.A. (1997)(First printing Dec. 1996).

*Primary Examiner*—Gopal C. Ray
*Attorney, Agent, or Firm*—Sharp, Comfort & Merrett, P.C.

[57] ABSTRACT

A computer system has a processor bus under control of the microprocessor itself, and this bus communicates with main memory, providing high-performance access for most cache fill operations. In addition, the system includes one or more expansion buses, preferably of the PCI type in the example embodiment. A host-to-PCI bridge is used for coupling the processor bus to the expansion bus. Other buses may be coupled to the PCI bus via PCI-to-(E) ISA bridges, for example. The host-to-PCI bridge contains queues for posted writes and delayed read requests. All transactions are queued going through the bridge, upstream or downstream. According to a feature of the invention, provision is made for split transactions, i.e., a read request which is not satisfied while the processor requesting it is still on the bus, but instead the bus is relinquished and other transactions intervene before the read result is available. A contemporary microprocessor such as a P6 has a deferred transaction protocol to implement split transactions, but this protocol is not available on a PCI bus. Split transactions are done by a "retry" command on a PCI bus, wherein a read request that cannot be completed immediately is queued and a "retry" response is sent back to the requester on the bus; this instructs the requester to retry (send the same command again) at a later time.

16 Claims, 8 Drawing Sheets

P6 BUS READ

P6 BUS WRITE

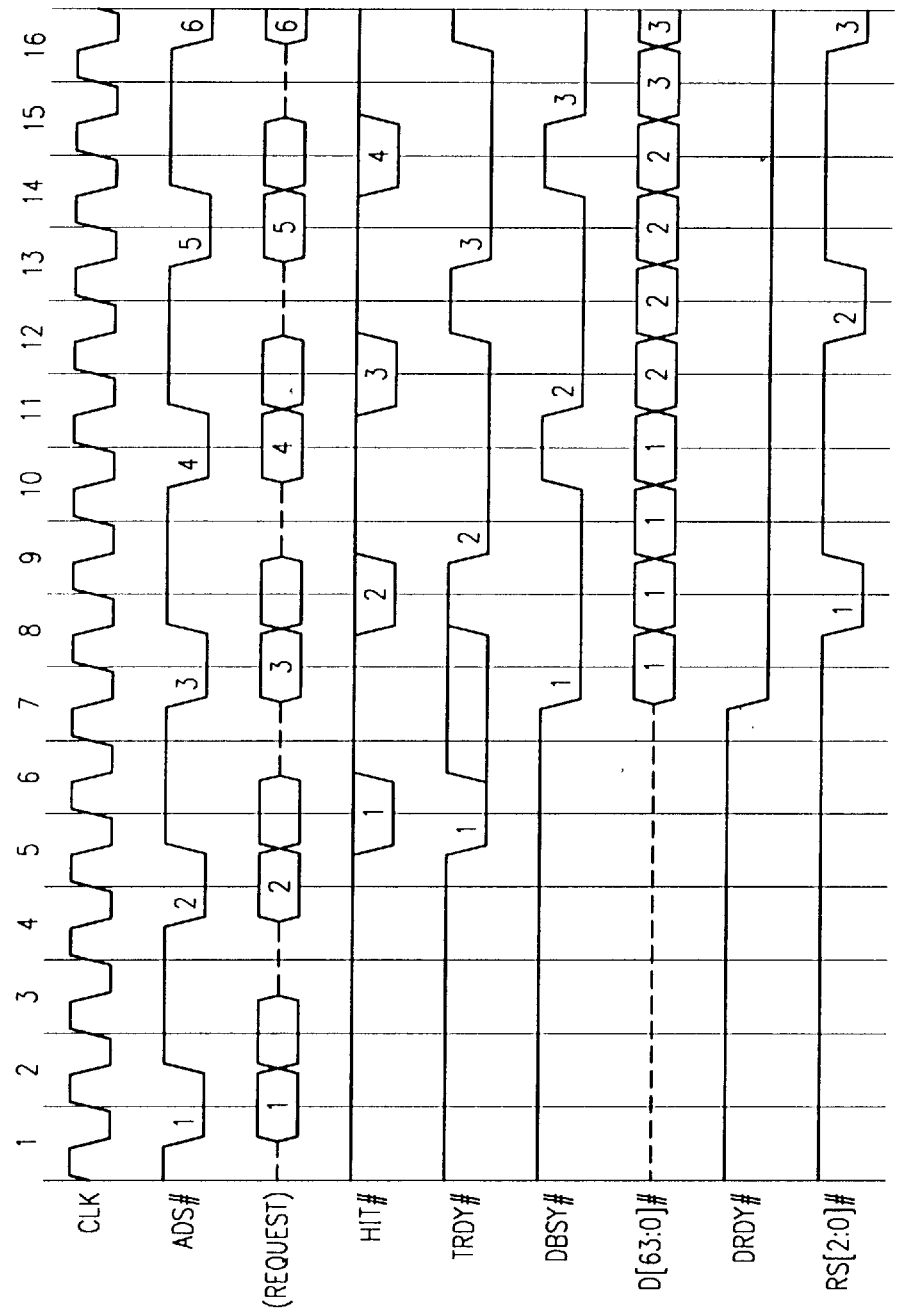

DELAYED TRANSACTION PROTOCOL FOR COMPUTER SYSTEM BUS

BACKGROUND OF THE INVENTION

This invention relates to computer systems, and more particularly to a bus protocol for a computer system which uses a bridge between a processor bus and a standardized system bus.

Computer systems of the PC type usually employ a so-called expansion bus to handle various data transfers and transactions related to I/O and disk access. The expansion bus is separate from the system bus or from the bus to which the processor is connected, but is coupled to the system bus by a bridge circuit.

For some time, all PC's employed the ISA (Industry Standard Architecture) expansion bus, which was an 8-MHz, 16-bit device (actually clocked at 8.33 MHz). Using two cycles of the bus clock to complete a transfer, the theoretical maximum transfer rate was 8.33 MBytes/sec. Next, the EISA (Extension to ISA) bus was widely used, this being a 32-bit bus clocked at 8-MHz, allowing burst transfers at one per clock cycle, so the theoretical maximum was increased to 33-MBytes/sec. As performance requirements increased, with faster processors and memory, and increased video bandwidth needs, a high performance bus standard was a necessity. Several standards were proposed, including a Micro Channel architecture which was a 10-MHz, 32-bit bus, allowing 40-MByte/sec, as well as an enhanced Micro Channel using a 64-bit data width and 64-bit data streaming, theoretically permitting 80-to-160 MByte/sec transfer. The requirements imposed by use of video and graphics transfer on networks, however, necessitate even faster transfer rates. One approach was the VESA (Video Electronics Standards Association) bus which was a 33 MHz, 32-bit local bus standard specifically for a 486 processor, providing a theoretical maximum transfer rate of 132-MByte/sec for burst, or 66-MByte/sec for non-burst; the 486 had limited burst transfer capability. The VESA bus was a short-term solution as higher-performance processors, e.g., the Intel P5 and P6 or Pentium and Pentium Pro processors, became the standard.

The PCI (Peripheral Component Interconnect) bus was proposed by Intel as a longer-term solution to the expansion bus standard, particularly to address the burst transfer issue. The original PCI bus standard has been upgraded several times, with the current standard being Revision 2.1, available from a trade association group referred to as PCI Special Interest Group, P.O. Box 14070, Portland, Oreg. 97214. The PCI Specification, Rev. 2.1, is incorporated herein by reference. Construction of computer systems using the PCI bus, and the PCI bus itself, are described in many publications, including "PCI System Architecture," 3rd Ed., by Shanley et al, published by Addison-Wesley Pub. Co., also incorporated herein by reference. The PCI bus provides for 32-bit or 64-bit transfers at 33- or 66-MHz; it can be populated with adapters requiring fast access to each other and/or with system memory, and that can be accessed by the host processor at speeds approaching that of the processor's native bus speed. A 64-bit, 66-MHz PCI bus has a theoretical maximum transfer rate of 528-MByte/sec. All read and write transfers over the bus can be burst transfers. The length of the burst can be negotiated between initiator and target devices, and can be any length.

System and component manufacturers have implemented PCI bus interfaces in various ways. For example, Intel Corporation manufactures and sells a PCI Bridge device under the part number 82450GX, which is a single-chip host-to-PCI bridge, allowing CPU-to-PCI and PCI-to-CPU transactions, and permitting up to four P6 processors and two PCI bridges to be operated on a system bus. Another example is offered by VLSI Technology, Inc., is a PCI chipset under the part number VL82C59x SuperCore, providing logic for designing a Pentium based system that uses both PCI and ISA buses. The chipset includes a bridge between the host bus and the PCI bus, a bridge between the PCI bus and the ISA bus, an a PCI bus arbiter. Posted memory write buffers are provided in both bridges, and provision is made for Pentium's pipelined bus cycles and burst transactions.

The "Pentium Pro" processor, commercially available from Intel Corporation, uses a processor bus structure as defined in the specification for this device, particularly as set forth in the publication "Pentium Pro Family Developer's Manual" Vols. 1–3, Intel Corp., 1996, available from McGraw-Hill, and incorporated herein by reference; this manual is also available from Intel by accessing <http://www.intel.com>.

A CPU operates at a much faster clock rate and data access rate than most of the resources it accesses via a bus. In earlier processors, such as those commonly available when the ISA bus and EISA bus was designed, this delay in reading data from a resource on the bus was handled by wait states. When a processor requested data, and it was not immediately available due to a slow memory or disk access, then the processor merely marked time using wait states, doing no useful work, until the data finally became available. In order to make use of this delay time, a processor such as the P6 provides a pipelined bus that allows multiple transactions to be pending on the bus at one time, rather than requiring one transaction to be finished before starting another. Also, the P6 bus allows split transactions, i.e., a request for data may be separated from the delivery of the data by other transactions on the bus. The P6 processor uses a technique referred to as "deferred transaction" to accomplish the split on the bus. In a deferred transaction, a processor sends out a read request, for example, and the target sends back a "defer" response, meaning that the target will send the data onto the bus, on its own initiative, when the data becomes available. Another transaction available on the P6 bus is a "retry" response. If a target is not able to supply a requested item, the target may respond to the request from the processor using a retry signal, and in that case the processor will merely send the request again the next time it has access to the bus.

The PCI bus specification as set forth above does not provide for split transactions There is no mechanism for issuing a "deferred transaction" signal, nor for generating the deferred data initiative. Accordingly, while a P6 processor can communicate with resources such as main memory that are on the processor bus itself using deferred transactions, it is not possible to employ this technique when communicating with disk drives, network resources, compatibility devices, etc., on an expansion bus.

SUMMARY OF THE INVENTION

It is therefore one object of the present invention to provide an improved way of handling delayed transactions in a computer system.

It is another object of the present invention to provide an improved computer system having enhanced performance when making accesses to devices on an expansion bus, using a bridge between a processor bus and an expansion bus. The present invention is also applicable to processor bus to processor bus bridges.

It is a further object of the present invention to provide an improved bridge circuit for connecting a processor bus to an expansion bus, particularly one allowing split transactions.

The above as well as additional objects, features, and advantages of the present invention will become apparent in the following detailed written description.

According to one embodiment of the invention, a computer system has a processor bus under control of the microprocessor itself, and this bus communicates with main memory, providing high-performance access for most cache fill operations. In addition, the system includes one or more expansion buses, preferably of the PCI type in the example embodiment. A host-to-PCI bridge is used for coupling the processor bus to the expansion bus. Other buses may be coupled to the PCI bus via PCI-to-(E) ISA bridges, for example. The host-to-PCI bridge contains queues for posted writes and delayed read requests. All transactions are queued going through the bridge, upstream or downstream. According to a feature of the invention, provision is made for split transactions, i.e., a read request which is not satisfied while the processor requesting it is still on the bus, but instead the bus is relinquished and other transactions intervene before the read result is available. A contemporary microprocessor such as a P6 has a deferred transaction protocol to implement split transactions, but this protocol is not available on a PCI bus. Split transactions are done by a "retry" command on a PCI bus, wherein a read request that cannot be completed immediately is queued and a "retry" response is sent back to the requester on the bus; this instructs the requester to retry (send the same command again) at a later time.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3a–3g are timing diagrams showing events occurring on the buses in the system of FIG. 1.

DESCRIPTION OF A PREFERRED EMBODIMENT

Figure 1:
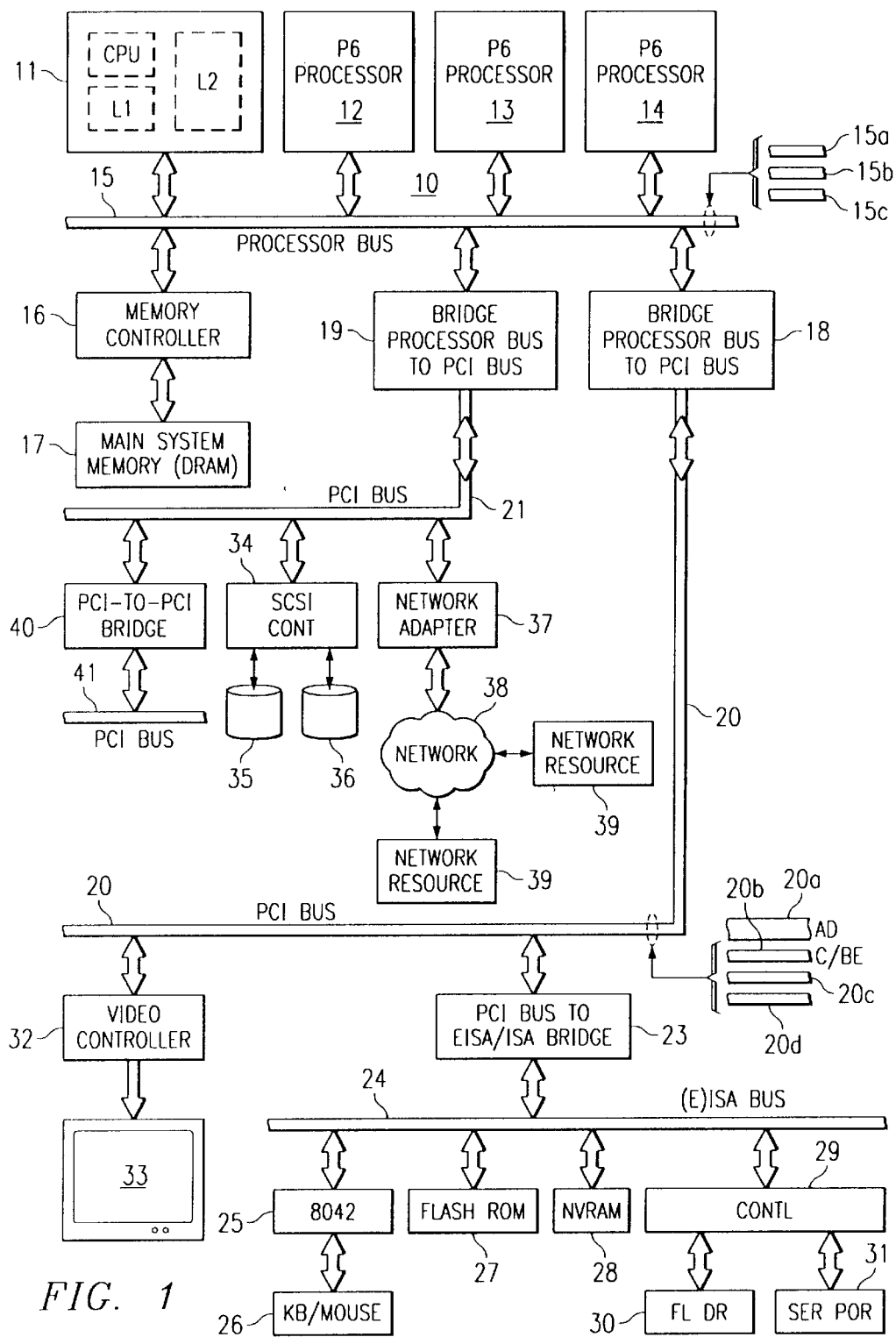
FIG. 1 is an electrical diagram in block form of a computer system in which a delayed transaction protocol may be implemented according an embodiment of the invention.

Referring to FIG. 1, a computer system 10 is shown which may use features of the invention, according to one embodiment. The system includes multiple processors 11, 12, 13 and 14 in this example, although the improvements may be used in a single processor environment. The processors are of the type manufactured and sold by Intel Corporation under the trade name "Pentium Pro," although the processors are also referred to as "P6" devices. The structure and operation of these processors 11, 12, 13, and 14 are described in detail in the above-mentioned Intel publications, as well as in numerous other publications. The processors are connected to a processor bus 15 which is generally of the structure specified by the processor specification, in this case a Pentium Pro specification. The bus 15 operates at a submultiple of the processor clock, so if the processors are 166 MHz or 200 MHz devices, for example, then the bus 15 is operated based on some multiple of the base clock rate. The main memory is shown connected to the processor bus 15, and includes a memory controller 16 and DRAM memory 17. The processors 11, 12, 13, and 14 each have a level-two cache L2 as a separate chip within the same package as the CPU chip itself, and of course the CPU chips have level-one L1 data and instruction caches included on-chip.

According to the invention, a bridge 18 or 19 is provided between the processor bus 15 and a PCI bus 20 or 21. Two bridges 18 and 19 are shown, although it is understood that many systems would require only one, and other systems may use more than two. In one example, up to four of the bridges may be used. The reason for using more than one bridge is to increase the potential data throughput. A PCI bus, as mentioned above, is a standardized bus structure that is built according to a specification agreed upon by a number of equipment manufacturers so that cards for disk controllers, video controllers, modems, network cards, and the like can be made in a standard configuration, rather than having to be customized for each system manufacturer. One of the bridges 18 or 19 is the primary bridge, and the remaining bridges (if any) are designated secondary bridges. The primary bridge 18 in this example carries traffic for the "legacy" devices such as (E)ISA bus, 8259 interrupt controller, VGA graphics, IDE hard disk controller, etc. The secondary bridge 19 does not usually incorporate any PC legacy items.

All traffic between devices on the concurrent PCI buses 20 and 21 and the system memory 17 must traverse the processor bus 15. Peer-to-peer transactions are allowed between a master and target device on the same PCI bus 20 or 21; these are called "standard" peer-to-peer transactions. Transactions between a master on one PCI bus and a target device on another PCI bus must traverse the processor bus 15, and these are "traversing" transactions; memory and I/O reads and writes are allowed in this case but not locked cycles and some other special events.

In an example embodiment as seen in FIG. 1, PC legacy devices are coupled to the PCI bus 20 by an (E)ISA bridge 23 to an EISA/ISA bus 24. Attached to the bus 24 are components such as a controller 25 (e.g., an 8042) for keyboard and mouse inputs 26, flash ROM 27, NVRAM 28, and a controller 29 for floppy drive 30 and serial/parallel ports 31. A video controller 32 for a monitor 33 is also connected to the bus 20. On the other PCI bus 21, connected by bridge 19 to the processor bus 15, are other resources such as a SCSI disk controller 34 for hard disk resources 35 and 36, and a network adapter 37. A network 38 is accessed by the adapter 37, and a large number of other stations (computer systems) 39 are coupled to the network. Thus, transactions on the buses 15, 20, and 21 may originate in or be directed to another station or server 39 on the network 38. The embodiment of FIG. 1 is that of a server, rather than a standalone computer system, but the bridge features can be used as well in a workstation or standalone desktop computer. The controllers such as 32, 34, and 37 would usually be cards fitted into PCI bus slots on the motherboard. If additional slots are needed, a PCI-to-PCI bridge 40 may be placed on the PCI bus 21 to access another PCI bus 41; this would not provide additional bandwidth, but would allow more adapter cards to be added. Various other server resources can be connected to the PCI buses 20, 21, and 41, using commercially-available controller cards, such as CD-ROM drives, tape drives, modems, connections to ISDN lines for internet access, etc.

The processor bus 15 contains a number of standard signal or data lines as defined in the specification for the Pentium Pro or P6 processor, mentioned above. In addition, certain special signals are included for the unique operation of the bridges 18 and 19, as will be described. The bus 15 contains thirty-three address lines 15a, sixty-four data lines 15b, and a number of control lines 15c. Most of the control lines are not material here and will not be referred to; also, data and address signals have parity lines associated with them which will not be treated here. The control signals of interest here are described in Table 1, and include the address strobe ADS#, data ready DRDY#, lock LOCK#, data busy DBSY#, defer DEFER#, request command REQ [4:0]# (five lines), response status RS[2:0]#, etc.

The PCI bus 20 (or 21) also contains a number of standard signal and data lines as defined in the PCI specification. This bus is a multiplexed address/data type, and contains sixty-four AD lines 20a, eight command/byte-enable lines 20b, and a number of control lines 20c as will be described. The definition of the control lines of interest here is given in Table 2, including frame FRAME#, initiator ready IRDY#, lock P_LOCK#, target ready TRDY#, STOP#, etc. In addition, there are PCI arbiter signals 20d, also described in Table 2, including request REQx#, grant P_GNTx#, MEMACK#, etc.

Figure 2:
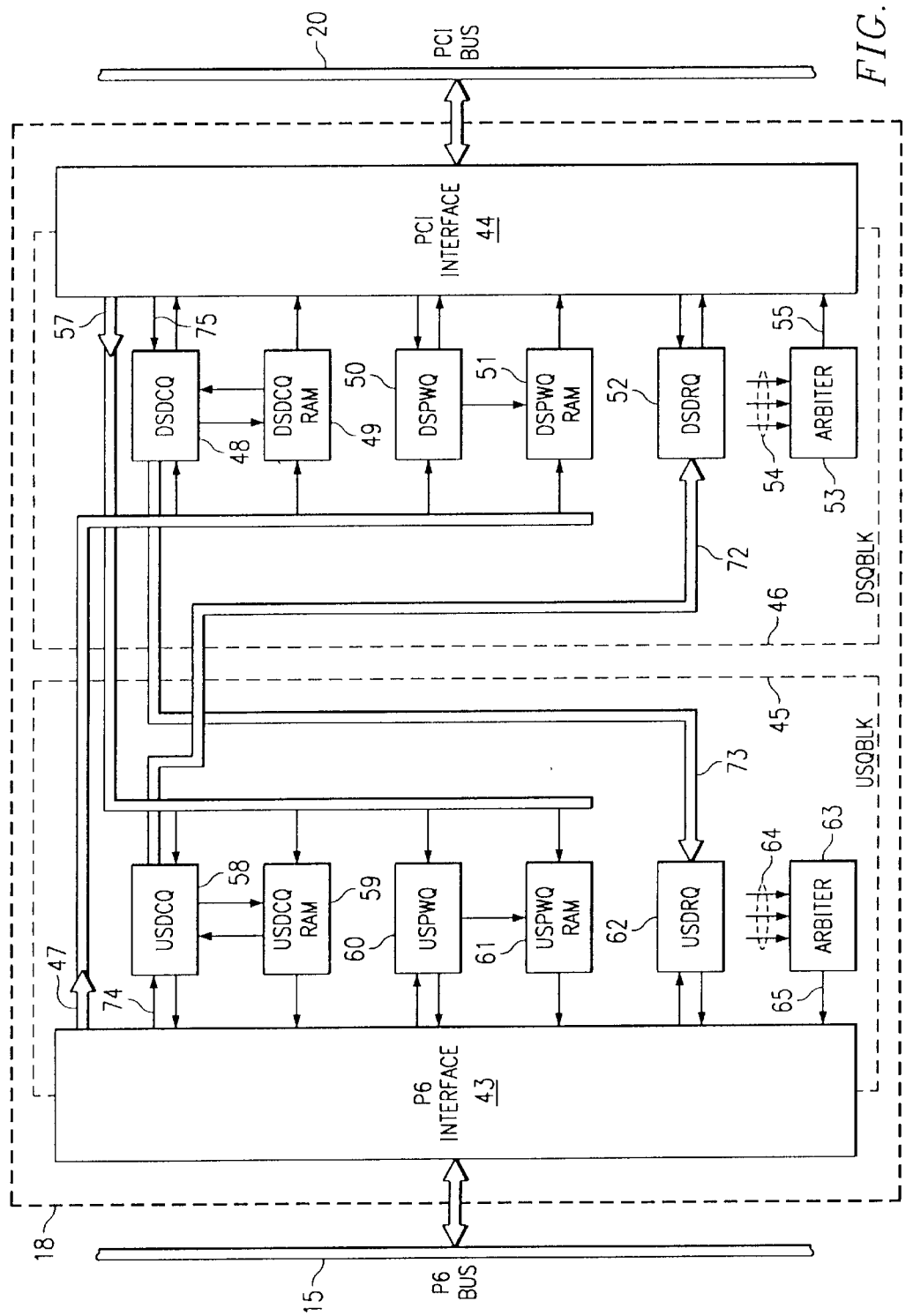
FIG. 2 is an electrical diagram in block form of a bridge circuit for use in the system of FIG. 1, according to one embodiment.

Referring to FIG. 2, the bridge circuit 18 (or 19) is shown in more detail. This bridge includes an interface circuit 43 serving to acquire data and signals from the processor bus 15 and to drive the processor bus with signals and data according to Table 1. An interface 44 serves to drive the PCI bus 20 and to acquire signals and data from the PCI bus according to Table 2. Internally, the bridge is divided into an upstream queue block 45 (US QBLK) and a downstream queue block 46 (DS QBLK). The term downstream means any transaction going from the processor bus 15 to the PCI bus 20, and the term upstream means any transaction going from the PCI bus back toward the processor bus 15. The bridge interfaces on the upstream side with the processor bus 15 which operates at a bus speed related to the processor clock rate which is, for example, 133 MHz, 166 MHz, or 200 MHz for Pentium Pro processors, whereas it interfaces on the downstream side with the PCI bus which operates at 33 or 66 MHz. Thus, one function of the bridge 18 is that of a buffer between asynchronous buses, and buses which differ in address/data presentation, i.e., the processor bus 15 has separate address and data lines, whereas the PCI bus uses multiplexed address and data lines. To accomplish these translations, all bus transactions are buffered in FIFO's.

For transactions traversing the bridge 18, all memory writes are posted writes and all reads are split transactions. A memory write transaction initiated by a processor device on the processor bus 15 is posted to the interface 43 of FIG. 2 and the processor goes on with instruction execution as if the write had been completed. A read requested by a processor 11–14 is not implemented at once, due to mismatch in the speed of operation of all of the data storage devices (except for caches) compared to the processor speed, so the reads are all treated as split transactions in some manner. An internal bus 47 conveys processor bus write transactions or read data from the interface 43 to a downstream delayed completion queue DSDCQ 48 and a RAM 49 for this queue, or to a downstream posted write queue 50 and a RAM 51 for this queue. Read requests going downstream are stored in a downstream delayed request queue DSDRQ 52. An arbiter 53 monitors all pending downstream posted writes and read requests via valid bits on lines 54 in the downstream queues and schedules which one will be allowed to execute next on the PCI bus according to the read and write ordering rules set forth in the PCI bus specification. Commands to the interface 44 from the arbiter 53 are on lines 55.

The components of upstream queue block 45 are similar to those of the downstream queue block 46, i.e., the bridge 18 is essentially symmetrical for downstream and upstream transactions. A memory write transaction initiated by a device on the processor bus 20 is posted to the PCI interface 44 of FIG. 2 and the master device proceeds as if the write had been completed. A read requested by a device on the PCI bus 20 is not implemented at once by a target device on the processor bus 15, so these reads are again treated as delayed transactions. An internal bus 57 conveys PCI bus write transactions or read data from the interface 44 to an upstream delayed completion queue USDCQ 58 and a RAM 59 for this queue, or to an upstream posted write queue 60 and a RAM 61 for this queue. Read requests going upstream are stored in an upstream delayed request queue USDRQ 62. An arbiter 63 monitors all pending upstream posted writes and read requests via valid bits on lines 64 in the upstream queues and schedules which one will be allowed to execute next on the processor bus according to the read and write ordering rules set forth in the PCI bus specification. Commands to the interface 43 from the arbiter 63 are on lines 65.

The structure and functions of the FIFO buffers or queues in the bridge 18 will now be described. Each buffer in a delayed request queue, i.e., DSDRQ 52 or USDRQ 62, stores a delayed request that is waiting for execution, and this delayed request consists of a command field, an address field, a write data field (not needed if this is a read request), and a valid bit. The upstream USDRQ 62 holds requests originating from masters on the PCI bus and directed to targets on the processor bus 15 and has eight buffers (in an example embodiment), corresponding one-to-one with eight buffers in the downstream delayed completion queue DSDCQ 48. The downstream delayed request queue DSDRQ 52 holds requests originating on the processor bus 15 and directed to targets on the PCI bus 20 and has four buffers, corresponding one-to-one with four buffers in the upstream delayed completion queue USDCQ 58. The DSDRQ 52 is loaded with a request from the interface 43 via bus 72 and the USDCQ 58. Similarly, the USDRQ 62 is loaded from interface 44 via bus 73 and DSDCQ 48. The reason for going through the DCQ logic is to check to see if a read request is a repeat of a request previously made. Thus, a read request from the bus 15 is latched into the interface 43 in response to an ADS#, capturing an address, a read command, byte enables, etc. This information is applied to the USDCQ 58 via lines 74, where it is compared with all enqueued prior downstream read requests; if it is a duplicate, this new request is discarded if the data is not available to satisfy the request, but if it is not a duplicate, the information is forwarded to the DSDRQ 52 via bus 72. The same mechanism is used for upstream read requests; information defining the request is latched into interface 44 from bus 20, forwarded to DSDCQ 48 via lines 75, and if not a duplicate of an enqueued request it is forwarded to USDRQ 62 via bus 73.

The delayed completion queues each include a control block 48 or 58 and a dual port RAM 49 or 59. Each buffer in a DCQ stores completion status and read data for one delayed request. When a delayable request is sent from one of the interfaces 43 or 44 to the queue block 45 or 46, the first step is to check within the DCQ 48 or 58 to see if a buffer for this same request has already been allocated. The address and the commands and byte enables are checked against the eight buffers in DCQ 48 or 58. If not a match, then a buffer is allocated (if one is available) the request is delayed (or deferred for the bus 15), and the request is forwarded to the DRQ 52 or 62 in the opposite side via lines 72 or 73. This request is run on the opposite bus, under control of the arbiter 53 or 63, and the completion status and data are forwarded back to the DCQ 48 or 58 via bus 47 or 57. After status/data are placed in the allocated buffer in the DCQ in this manner, this buffer is not valid until ordering rules are satisfied; e.g., a read cannot be completed until previous writes are completed. When a delayable request "matches" a DCQ buffer and the requested data is valid, then the request cycle is ready for immediate completion.

The downstream DCQ 48 stores status/read data for PCI-to-host delayed requests, and the upstream DCQ 58 stores status/read data for Host-to-PCI delayed or deferred requests. The upstream and downstream operation is slightly different in this regard. The bridge control circuitry causes prefetch of data into the DSDCQ buffers 48 on behalf of the master, attempting to stream data with zero wait states after the delayed request completes. DSDCQ buffers are kept coherent with the host bus 15 via snooping, which allows the buffers to be discarded as seldom as possible. Requests going the other direction are not subjected to prefetching, however, since many PCI memory regions have "read side effects" (e.g., stacks and FIFO's) so the bridge never prefetches data into these buffers on behalf of the master, and USDCQ buffers are flushed as soon as their associated deferred reply completes.

The posted write queues each contain a control block 50 or 60 and a dual port RAM memory 51 or 61, with each one of the buffers in these RAMs storing command and data for one write. Only memory writes are posted, i.e., writes to I/O space are not posted. Because memory writes flow through dedicated queues within the bridge, they cannot be blocked be delayed requests that precede them; this is a requirement of the PCI specification. Each of the four buffers in DSPWQ 50, 51 stores 32-Bytes of data plus commands for a host-to-PCI write; this is a cache line—the bridge might receive a cacheline-sized write if the system has a PCI video card that supports the P6 USWC memory type. The four buffers in the DSPWQ 50, 51 provide a total data storage of 128-bytes. Each of the four buffers in USPWQ 60, 61 stores 256-Bytes of data plus commands for a PCI-to-host write; this is eight cache lines (total data storage=1-KByte). Burst memory writes that are longer than eight cache lines can cascade continuously from one buffer to the next in the USPWQ. Often, an entire page (e.g., 4-KB) is written from disk to main memory in a virtual memory system that is switching between tasks; for this reason, the bridge has more capacity for bulk upstream memory writes than for downstream.

The arbiters 53 and 63 control event ordering in the QBLKs 45 and 46. These arbiters make certain that any transaction in the DRQ 52 or 62 is not attempted until posted writes that preceded it are flushed, and that no datum in a DCQ is marked valid until posted writes that arrived in the QBLK ahead of it are flushed.

Figure 3A:
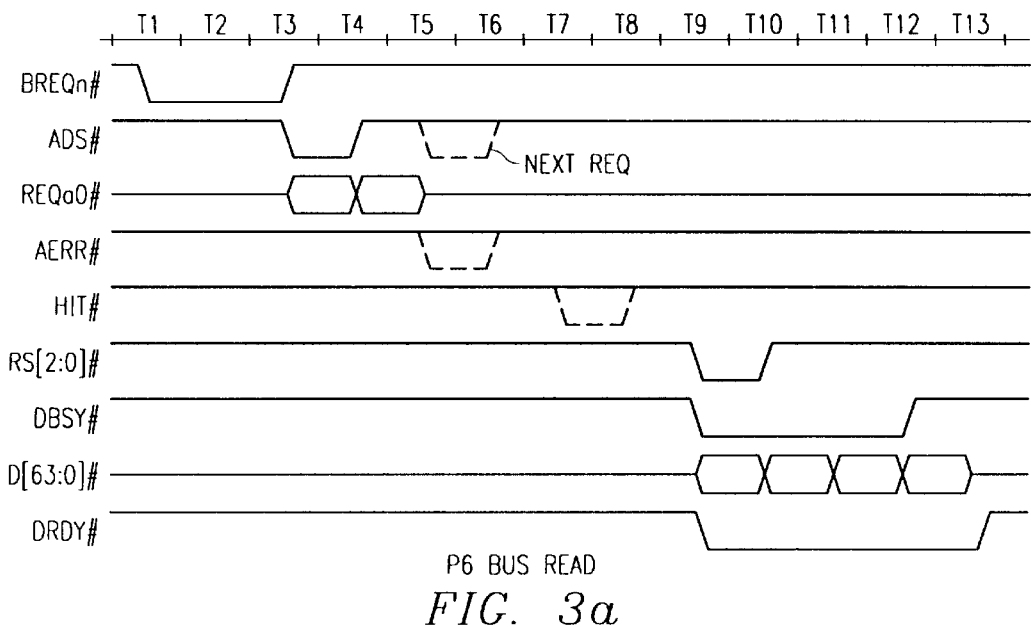

Referring to FIG. 3a, the data and control signal protocol on the bus 15 is defined by the processors 11–14, which in the example are Intel "Pentium Pro" devices. The processors 11–14 have a bus interface circuit within each chip which provides the bus arbitration and snoop functions for the bus 15. A P6 bus cycle includes six phases: an arbitration phase, a request phase, an error phase, a snoop phase, a response phase, and a data phase. A simple read cycle where data is immediately available (i.e., a read from main memory 17) is illustrated in FIG. 3a. This read is initiated by first acquiring the bus; a bus request is asserted on the BREQn# line during T1; if no other processors having a higher priority (using a rotating scheme) assert their BREQn#, a grant is assumed and an address strobe signal ADS# is asserted in T2 for one clock only. The address, byte enables and command signals are asserted on the A# lines, beginning at the same time as ADS#, and continuing during two cycles, T3 and T4, i.e., the asserted information is multiplexed onto the A# lines in two cycles. During the first of these, the address is applied, and during the second, the byte enables and the commands are applied. The error phase is a parity check on the address bits, and if a parity error is detected an AERR# signal is asserted during T5, and the transaction aborts. The snoop phase occurs during T7; if the address asserted during T3 matches the tag of any of the L2 cache lines and is modified, or any other resource on bus 15 for which coherency is maintained, a modified HITM# signal is asserted during T7, and a writeback must be executed before the transaction proceeds. That is, if the processor 11 attempts to read a location in main memory 17 which is cached and modified at that time in the L2 cache of processor 12, the read is not allowed to proceed until a writeback of the line from L2 of processor 12 to memory 17 is completed, so the read is delayed. Assuming that no parity error or snoop hit occurs, the transaction enters the response phase during T9. On lines RS[2:0]#, a response code is asserted during T9; the response code indicates "normal data," "retry," "deferred," etc., depending on when the data is going to be available in response to the read request. Assuming the data is immediately available, the response code is "normal data" and the data itself is asserted on data lines D[63:0]# during T9 and T12 (the data phase); usually a read request to main memory is for a cache line, 32-bytes, so the cache line data appears on the data lines during four cycles, 8-bytes each cycle, as shown. The data bus busy line DBSY# is sampled before data is asserted, and if free then the responding agent asserts DBSY# itself during T9–T11 to hold the bus, and asserts data ready on the DRDY# line to indicate that valid data is being applied to the data lines.

Several read requests can be pending on the bus 15 at the same time. That is, another request can be asserted by any agent which is granted the bus (the same processor, or by a different processor), during T5, indicated by dotted lines for the ADS# signal, and the same sequence of error, snoop, response, and data phases would play out in the same order. as discussed. Up to eight transactions can be pending on the bus 15 at one time. The transactions complete in order unless they are split with a deferred response. Transactions that receive a deferred response may complete out of order.

Figure 3B:
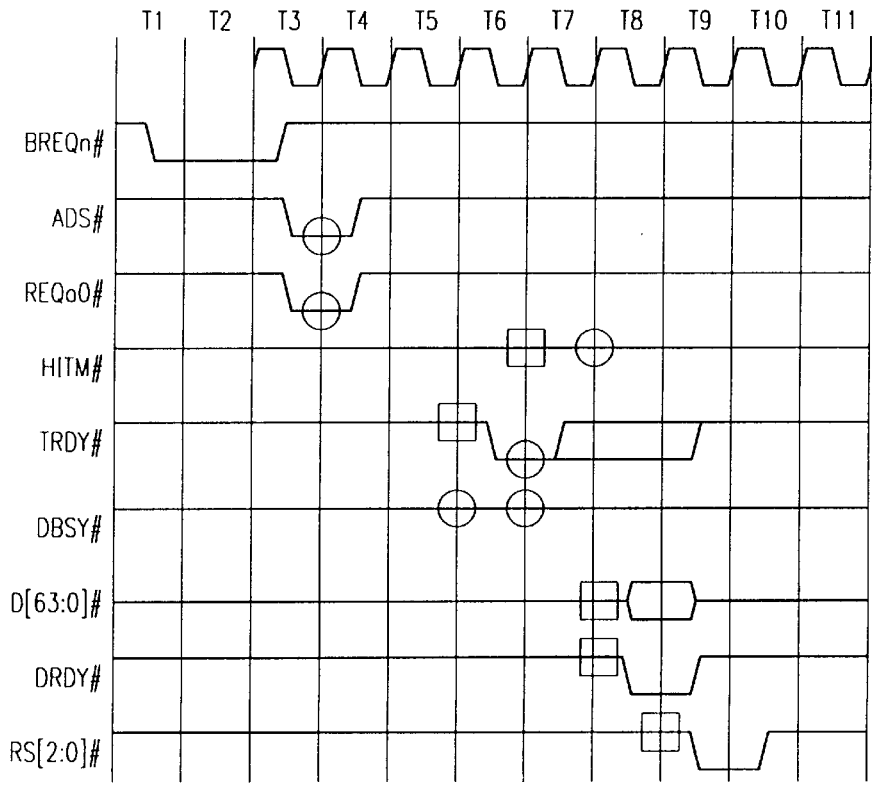

A simple write transaction on the P6 bus 15 is illustrated in FIG. 3b. As in a read transaction, after being granted the bus, in T3 the initiator asserts ADS# and asserts the REQaO# (command and B/E's). TRDY# is asserted three clocks later in T6. TRDY# is active and DBSY# is inactive in T8, so data transfer can begin in T9; DRDY# is asserted at this time. The initiator drives data onto the data bus D[63:0]# during T9.

Figure 3C:
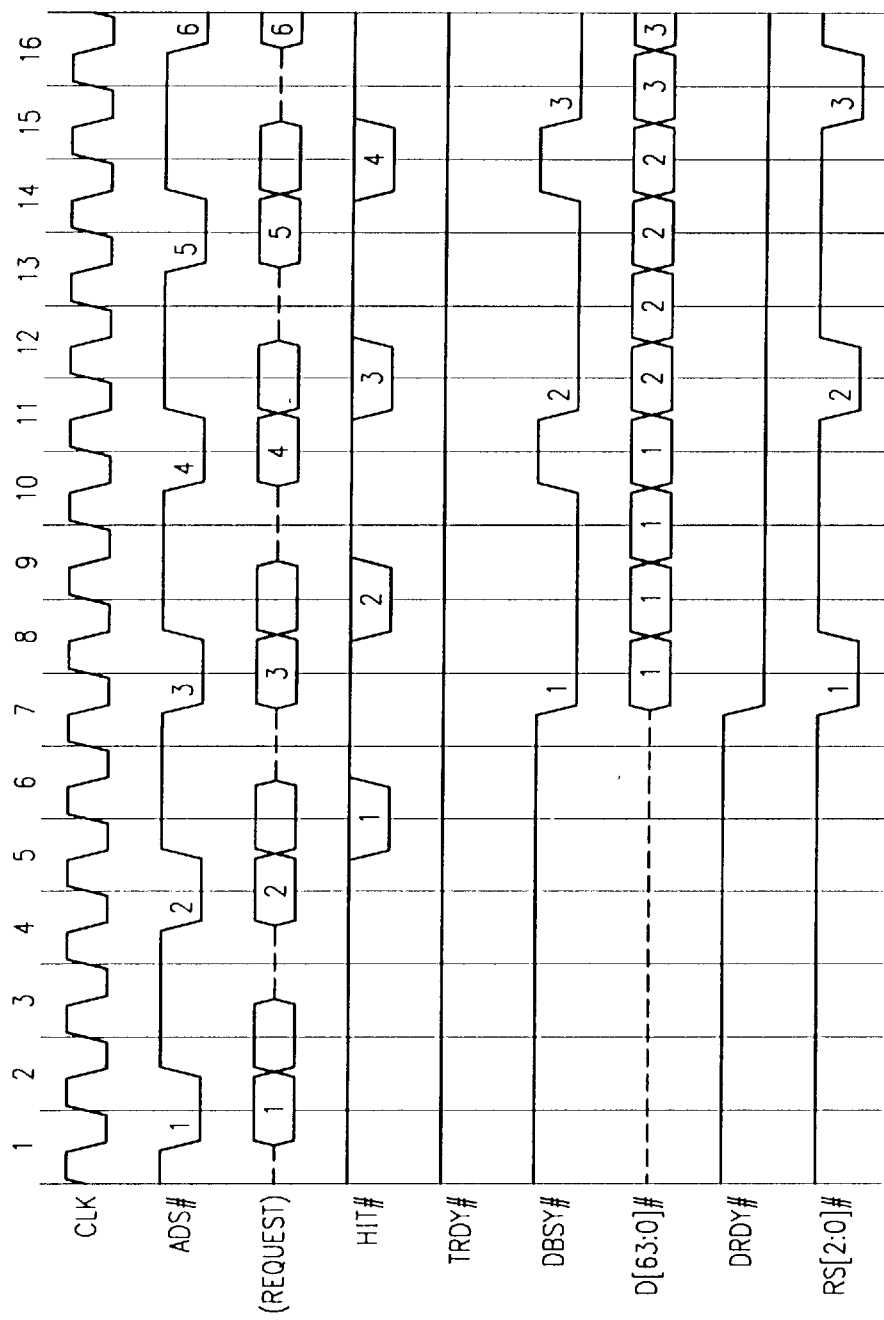

A burst or full-speed read transaction is illustrated in FIG. 3c. Back-to-back read data transfers from the same agent with no wait states. Note that the request for transaction-4 is being driven onto the bus while data for transaction-1 is just completing in T10, illustrating the overlapping of several transactions. DBSY# is asserted for transaction-1 in T7 and remains asserted until T10. Snoop results indicate no implicit writeback data transfers so TRDY# is not asserted.

Likewise, a burst or full-speed write transaction with no wait states and no implicit writebacks is illustrated in FIG. 3d. TRDY# for transaction-2 can be driven the cycle after RS[2:0]# is driven. In T11, the target samples TRDY# active and DBSY# inactive and accepts data transfer starting in T12. Because the snoop results for transaction-2 have been observed in T9, the target is free to drive the response in T12.

Figure 3E:
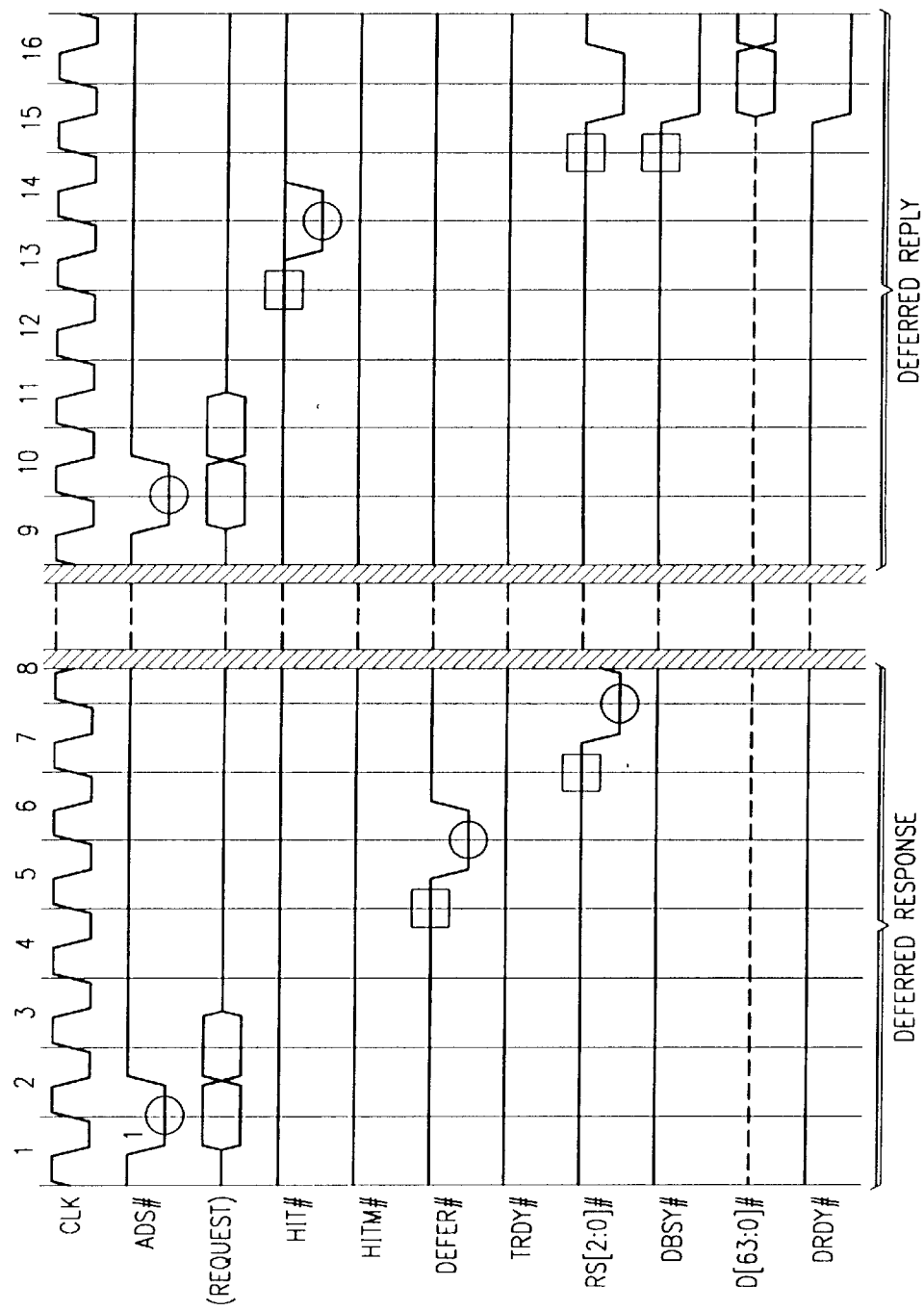

A deferred read transaction is illustrated in FIG. 3e. This is a split transaction, meaning the request is put out on the bus, then at some time later the target initiates a reply to complete the transaction, while other transactions occur on the bus in the intervening time. Agents use the deferred response mechanism of the P6 bus when an operation has significantly greater latency than the normal in-order response. During the request phase on the P6 bus 15, an agent can assert Defer Enable DEN# to indicate if the transaction can be given a deferred response. If DEN# is inactive, the transaction cannot receive a deferred response; some transactions must always be issued with DEN# inactive, e.g., bus-locked transactions, deferred replies, writebacks. When DEN# is inactive, the transaction may be completed in-order or it may be retried, but it cannot be deferred. A deferred transaction is signalled by asserting DEFER# during the snoop phase followed by a deferred response in the response phase. On a deferred response, the response agent must latch the deferred ID, DID[7:0]#, issued during the request phase, and after the response agent completes the original request, it must issue a matching deferred-reply bus transaction, using the deferred ID as the address in the reply transaction's request phase. The deferred ID is eight bits transferred on pins Ab[23:16] in the second clock of the original transaction's request phase.

Figure 3F:
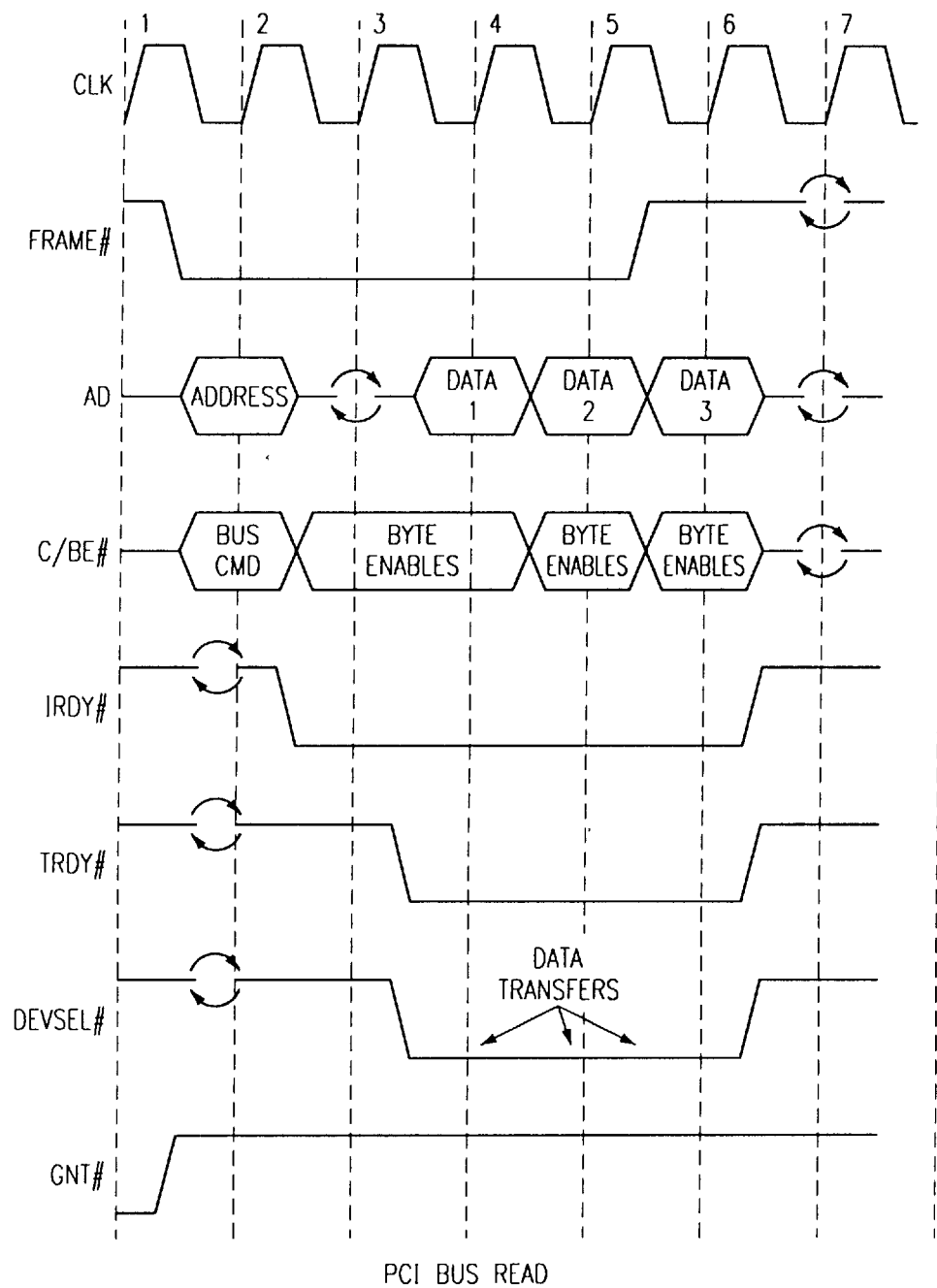

A read transaction on the PCI bus 20 (or 21) is illustrated in FIG. 3f. It is assumed that the bus master has already arbitrated for and been granted access to the bus. The bus master must then wait for the bus to become idle, which is done by sampling FRAME# and IRDY# on the rising edge of each clock (along with GNT#); when both are sampled deasserted, the bus is idle and a transaction can be initiated by the bus master. At start of clock T1, the initiator asserts FRAME#, indicating that the transaction has begun and that a valid start address and command are on the bus. FRAME# must remain asserted until the initiator is ready to complete the last data phase. When the initiator asserts FRAME#, it also drives the start address onto the AD bus and the transaction type onto the Command/Byte Enable lines, C/BE [3:0]#. A turn-around cycle (i.e., a dead cycle) is required on all signals that may be driven by more than one PCI bus agent, to avoid collisions. At the start of clock T2, the initiator ceases driving the AD bus, allowing the target to take control of the AD bus to drive the first requested data item back to the initiator. Also at the start of clock T2, the initiator ceases to drive the command onto the C/BE lines and uses them to indicate the bytes to be transferred in the currently addressed doubleword (typically, all bytes are asserted during a read). The initiator also asserts IRDY# during T2 to indicate it is ready to receive the first data item from the target. The initiator asserts IRDY# sand deasserts FRAME# simultaneously to indicate that it is ready to complete the last data phase (T5 in FIG. 3f). During clock T3, the target asserts DEVSEL# to indicate that it recognized its address and will participate in the transaction, and begins to drive the first data item onto the AD bus while it asserts TRDY# to indicate the presence of the requested data. When the initiator sees TRDY# asserted in T3 it reads the first data item from the bus. The initiator keeps IRDY# asserted upon entry into the second data phase in T4, and does not deassert FRAME#, indicating it is ready to accept the second data item. In a multiple-data phase transaction (e.g., a burst), the target latches the start address into an address counter, and increments this address to generate the subsequent addresses.

Figure 3G:
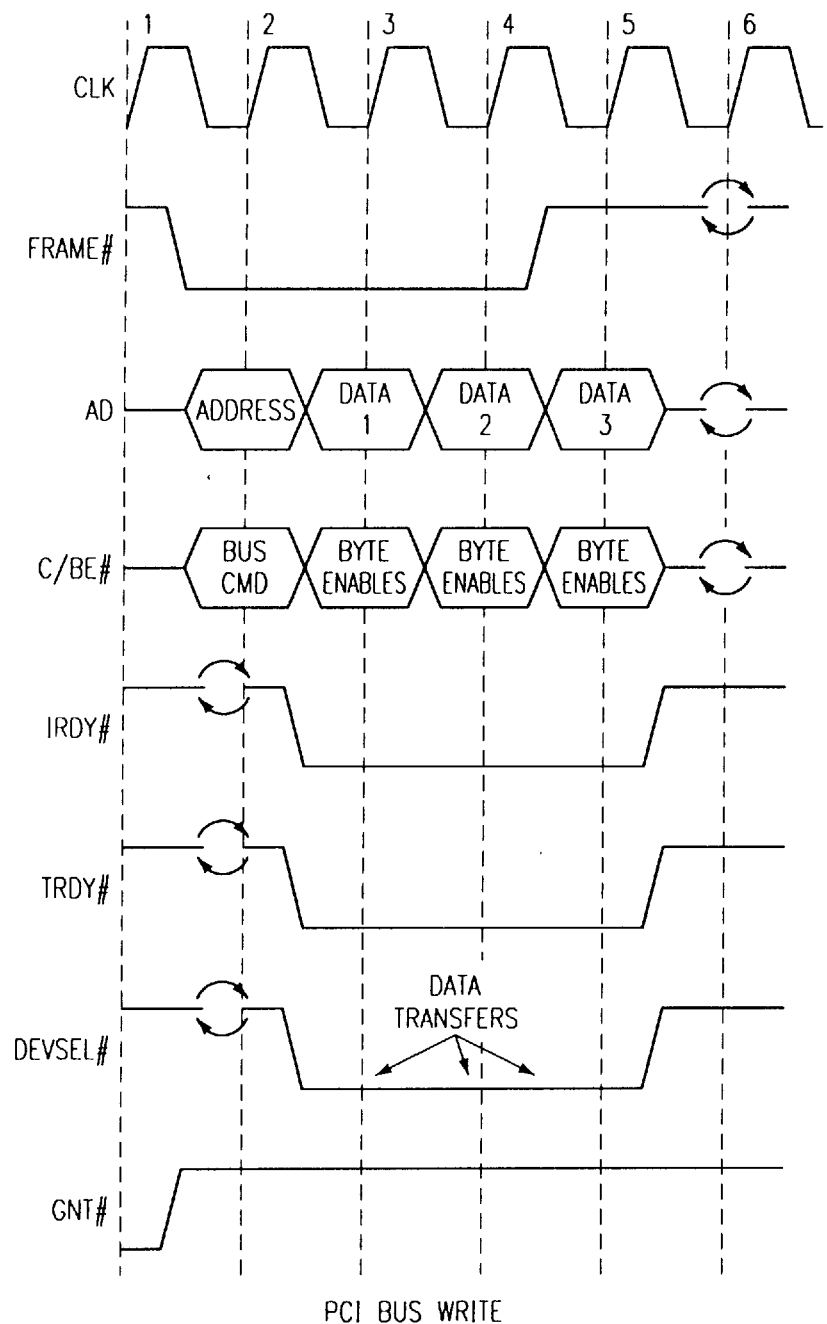

A write transaction on the PCI bus 20 (or 21) is illustrated in FIG. 3g. At start of clock T1, the write initiator asserts FRAME#, indicating that the transaction has begun and that a valid start address and command are on the bus. FRAME# remains asserted until the initiator is ready to complete the last data phase. When the initiator asserts FRAME#, it also drives the start address onto the AD bus and the transaction type onto the C/BE[3:0]# lines. In clock T2, the initiator switches to driving the AD bus with the data to be written; no turn-around cycle is needed since the initiator continues to drive the bus itself. The initiator also asserts IRDY# in T2 to indicate the presence of data on the bus. FRAME# is not deasserted until the last data phase. During clock T2, the target decodes the address and command and asserts DEVSEL# to claim the transaction, and asserts TRDY# to indicate readiness to accept the first data item.

In a delayed transaction, the an initiator device on the P6 bus 15 sends out a signal called "delay enable" or DEN#, indicating whether this transaction can be deferred. If it is required that this transaction complete in order, DEN# is not asserted, so the device must "retry" if it can't complete in order. If the target sees DEN# asserted, and it can't complete in order, its response is "defer" and the initiator (P6 processor) then initiates nothing further for this transaction; when the target has the data, it sends out a new address strobe on the bus, with a defer ID, and a defer reply.

As noted, the host-to-PCI bridge 18 or 19 contains queues for posted writes and delayed read requests; all transactions are queued going through the bridges, upstream or downstream. According to an important feature, provision is made for split transactions, i.e., a read request which is not satisfied while the processor 11–14 requesting it is still on the bus 15, but instead the bus 15 is relinquished and other transactions intervene before the read result is available. The P6 has a deferred transaction protocol to implement split transactions, but this protocol is not available on a PCI bus 20 or 21. Instead, split transactions are done by a "retry" command on the PCI bus, wherein a read request that cannot be completed immediately is queued and a "retry" response is sent back to the requester on the bus 20 or 21; this instructs the requester to retry (send the same command again) at a later time.

While the invention has been particularly shown and described with reference to a preferred embodiment, it will be understood by those skilled in the art that various changes in form and detail may be made therein without departing from the spirit and scope of the invention.

TABLE 1

| P6 Bus Signals | |
|---|---|
| ADS# - | Address Strobe, asserted to defines the beginning of the Request Phase. The REQa[4:0]# and Aa[35:3]# signals are valid in the clock that ADS# is asserted (the "a") clock). The REQb[4:0]# and Ab[35:3]# signals are valid in the next clock after ADS# was asserted (the "b") clock) |
| A[35:3]# - | Address signals, conveying information during both clocks of two-clock request phase. Aa[35:3]# are signals during first clock and Ab[35:3]# are signals during second clock. Aa[35:3]# convey address, and Ab[35:3]# convey cycle-type, byte enable, deferred ID, etc. |
| D[63:0]# - | System Data signals - carry the data for a transaction during the data phase. |

TABLE 1-continued

P6 Bus Signals

| | |
|---|---|
| REQ[4:0]# - | Request command signals, asserted during both clocks of the request phase, indicating type of transaction being requested and into about that transaction. |
| RS[2:0]# - | Response status signals, driven by the target during the response phase, indicate how current transaction will be processed. Valid responses include: Normal with or without data; Idle; Retry; Defer; Implicit Writeback. |
| DBSY# - | Data bus busy signal, asserted by the agent driving the data on D[63:0]# to indicate a multi-clock data phase. Asserted on first clock that data may be driven, deasserted when the data bus is no longer needed. |
| DEFER# - | Defer signal, used by target to indicate to the agent issuing the transaction that it may not be completed in order. An active DEFER# means that the associated transaction will complete with a DEFER REPLY or a RETRY response. |
| DRDY# - | Date ready signal, driven in same clock as the D[63:0]# signals and indicates that the data is valid and may be sampled. |
| TRDY# - | Target ready signal, driven by the target for write transactions to indicate that target is ready to accept the current data for a write or writeback. |
| HIT# - | Cache hit signal for snooping, along with HITM# determine results of snoop phase. HITM# is the cache hit to modified signal. |
| AERR# - | Address parity error, driven during error phase. |
| GNTn# - | Arbiter grant signal to master, indicating initiator is granted the bus. |
| LOCK# - | Bus lock signal, asserted from the request phase of the first transaction through the response phase of the final transaction. No other bus masters may issue transactions during a bus lock. Locked cycle may be stopped on the first transaction if DEFER# is asserted, or by error signals. |

TABLE 2

PCI Bus Signals

| | |
|---|---|
| AD[31:0] - | Address/Data (with AD[63:32] for 64-bit bus) - conveys the address for a read or write request, then used to transfer data. |
| C/BE#[3:0] - | Command/Byte Enable (with C/BE#[7:4] for 64-bit bus) - conveys bus commands in first phase then byte enables in later phases. |
| FRAME# - | Asserted by master to begin a transaction. Held in asserted state until transaction is completed. |
| TRDY# - | Target Ready - indicates that target is ready to receive or transfer data. |
| IRDY# - | Initiator Ready - indicates that master or initiator of transaction is ready to send or receive data. |
| DEVSEL# - | Device Select - indicates driving device has decoded its address as the target of the current access. As an input, it indicates whether any device on the bus has been selected. |
| STOP# - | Target is requesting the master to stop the current bus transaction. Aborts. |
| REQ# - | Request - arbitration signal asserted by an initiator when requesting the bus. |
| GNT# - | Grant - signal from arbiter to agent in response to REQ#, indicating that bus has been granted to agent - one of six signals with one going to each device. |
| LOCK# - | Atomic operation, may require multiple transactions to complete, asserted when transaction must be completed before any other transaction can be initiated. Only supported going downstream. |

What is claimed is:

1. A method of operating a computer system having a CPU with a system bus coupled to the CPU, and having an expansion bus coupled to the system bus by a bridge, comprising the steps of:

initiating by said CPU a split transaction on said system bus directed to a device coupled to said expansion bus, said split transaction being initiated by a read request being applied to said system bus by said CPU;

receiving said read request in said bridge from said system bus, and:

sending back to said system bus a retry-message signalling said CPU to retry said read request at a later time;

enqueueing said read request within said bridge;

executing said read request on said expansion bus to produce resulting read data;

enqueueing said read data within said bridge;

retrying said read request on said system bus by said CPU; and applying said read data to said system bus from said bridge.

2. A method according to claim 1 wherein said split transaction includes a defer-enable signal on said system bus.

3. A method according to claim 2 wherein said retry message is sent by said bridge after intervening request signals on said system bus.

4. A method according to claim 1 wherein said expansion bus is a standardized "PCI" bus.

5. A method according to claim 1 wherein said CPU is a P6 microprocessor.

6. A method according to claim 1 wherein a plurality of CPUs are coupled to said system bus, each of said plurality of CPUs being capable of issuing a split transaction.

7. A method according to claim 6 wherein a plurality of bridges are coupled to said system bus, each of said plurality of bridges being capable of performing said steps of enqueueing and issuing said retry message.

8. A method according to claim 1 wherein said step of signalling a retry is by a message sent on said system bus by said bridge after recognizing that said request should not be completed at the time of the request on said expansion bus.

9. A computer system, comprising a CPU;

a system bus coupled to the CPU;

an expansion bus;

a bridge coupled between the system bus and the expansion bus;

a device coupled to the expansion bus;

a signal path in said system bus for initiating by said CPU a split transaction on said system bus directed to said device coupled to said expansion bus, said split transaction being initiated by a read request being applied to said system bus by said CPU;

a controller in said bridge receiving said read request from said system bus, and sending back to said system bus a retry-message signalling said CPU to retry said read request at a later time; and a queue for enqueueing said read request within said bridge.

10. A system according to claim 9 wherein said split transaction includes a defer-enable signal on said system bus.

11. A system according to claim 9 wherein said retry message is sent by said bridge after intervening request signals on said system bus.

12. A system according to claim 9 wherein said expansion bus is a standardized "PCI" bus.

13. A system according to claim 9 wherein said CPU is a P6 microprocessor.

14. A system according to claim 9 and further comprising at least one other CPU coupled to said system bus, said at least one other CPU capable of issuing a split transaction.

15. A system according to claim 14 and further comprising at least one other bridge coupled to said system bus, the at least one other bridge being capable of performing said steps of enqueueing and issuing said retry message.

16. A system according to claim 9 wherein said signalling a retry is by a message sent on said system bus by said bridge after recognizing that said request cannot be completed in order on said expansion bus.

* * * * *